(12) United States Patent
Mottet et al.

(10) Patent No.: US 11,780,142 B2
(45) Date of Patent: Oct. 10, 2023

(54) EXTRUSION SYSTEM FOR TIRE TREAD MANUFACTURING WITH HORIZONTALLY ARRANGED EXTRUSION BARRELS

(71) Applicant: Compagnie Generale des Etablissements Michelin, Clermont-Ferrand (FR)

(72) Inventors: Julien Mottet, Greenville, SC (US); John David Wiens, Simpsonville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 368 days.

(21) Appl. No.: 17/267,188

(22) PCT Filed: Aug. 31, 2018

(86) PCT No.: PCT/US2018/049145
§ 371 (c)(1),
(2) Date: Feb. 9, 2021

(87) PCT Pub. No.: WO2020/046378
PCT Pub. Date: Mar. 5, 2020

(65) Prior Publication Data
US 2021/0299928 A1    Sep. 30, 2021

(51) Int. Cl.
*B29C 48/21* (2019.01)
*B29C 48/355* (2019.01)
(Continued)

(52) U.S. Cl.
CPC .......... *B29C 48/025* (2019.02); *B29C 48/022* (2019.02); *B29C 48/131* (2019.02);
(Continued)

(58) Field of Classification Search
CPC ..... B29C 48/022; B29C 48/025; B29C 48/07; B29C 48/131; B29C 48/21; B29C 48/307;
(Continued)

(56) References Cited

U.S. PATENT DOCUMENTS 4,683,095 A * 7/1987 Tolonen .................. B29C 48/30
425/327
6,554,041 B1 * 4/2003 Ohki ....................... B29C 48/08
156/425
(Continued)

FOREIGN PATENT DOCUMENTS

JP    S5214679    *  2/1977
JP    S5458762    *  5/1979
(Continued)

OTHER PUBLICATIONS

Machine translation of WO 2015028166, Mar. 5, 2015, pp. 1-16. (Year: 2015).*

(Continued)

*Primary Examiner* — Xiao S Zhao
*Assistant Examiner* — Joseph S Leyson
(74) *Attorney, Agent, or Firm* — Neal P. Pierotti

(57) ABSTRACT

An extrusion system (10) is provided that has first and second extruders (12,14) with first and second extrusion barrels (50,52). First and second extruded components (24, 26) are transferred through the barrels (50,52) to a die (22) to coextrude tire tread (20) from the first and second extruded components (24,26). A horizontal plane (70) is located above ground in a vertical direction (40) and extends through both the first extrusion barrel (50) and the second extrusion barrel (52).

9 Claims, 3 Drawing Sheets

(51) Int. Cl.
  *B29C 48/495* (2019.01)
  *B29C 48/305* (2019.01)
  *B29C 48/025* (2019.01)
  *B29C 48/00* (2019.01)
  *B29C 48/03* (2019.01)
  *B29D 30/00* (2006.01)
  *B29K 7/00* (2006.01)
  *B29L 30/00* (2006.01)

(52) U.S. Cl.
  CPC ............ *B29C 48/21* (2019.02); *B29C 48/307* (2019.02); *B29C 48/355* (2019.02); *B29C 48/495* (2019.02); *B29D 30/005* (2013.01); *B29K 2007/00* (2013.01); *B29L 2030/002* (2013.01)

(58) Field of Classification Search
  CPC ..... B29C 48/355; B29C 48/49; B29C 48/495; B29D 30/005; B29K 2007/00; B29L 2030/002
  See application file for complete search history.

(56) References Cited

U.S. PATENT DOCUMENTS

2017/0001360 A1* 1/2017 Dyrlund ................. B29C 48/37
2018/0147769 A1* 5/2018 Reineke ............... B29C 48/307

FOREIGN PATENT DOCUMENTS

| JP | 2005096388 | * | 4/2005 |
| JP | 2005254464 | * | 9/2005 |
| JP | 2006192582 | * | 7/2006 |
| JP | 2014133392 | * | 7/2014 |
| WO | 2015028166 | * | 3/2015 |
| WO | 2018234711 | * | 12/2018 |

OTHER PUBLICATIONS

European Patent Office; International Search Report and Written Opinion for patent application PCT/US2018/049145, filed Aug. 31, 2018; Publisher: European Patent Office, Rijswijk, Netherlands; May 5, 2019; pp. 1-12, enclosed.

* cited by examiner

EXTRUSION SYSTEM FOR TIRE TREAD MANUFACTURING WITH HORIZONTALLY ARRANGED EXTRUSION BARRELS

CROSS-REFERENCE TO RELATED APPLICATIONS

The present application is a 35 U.S.C. § 371 application of PCT/US18/49145 filed on Aug. 31, 2018 and entitled "Extrusion System for Tire Tread Manufacturing with Horizontally Arranged Extrusion Barrels." PCT/US18/49145 is incorporated by reference herein in its entirety for all purposes.

FIELD OF THE INVENTION

The present invention relates generally to an extrusion system for the production of tire tread. More particularly, the present application involves a tire tread extrusion system with horizontally arranged extrusion barrels that enable coextrusion of the tire tread with the elimination of a pit into which one or more but not all of the extrusion barrels would otherwise be located.

BACKGROUND

Extrusion is a method of manufacture in which an elastomeric material is formed into either a final or intermittent shape. The elastomeric material that is shaped may be any type of material capable of being pressed and formed from one shape into another by pressure and, in some instances, heat. The elastomeric material may be synthetic or natural rubber, a combination of both synthetic and natural rubber, synthetic resin, or a combination of rubber and synthetic resin. Tire components are a type of product formed of an elastomeric material through the use of an extrusion process.

One type of extrusion process makes use of a roller nose extruder. Here, the elastomeric material is first located within an extrusion barrel into which a helical screw is located. Rotation of the helical screw applies pressure to the elastomeric mass and forces it out of the extrusion barrel. The pushed elastomeric material may then be directed into a transition pressure chamber of an extrusion die head. In the transition pressure chamber the elastomeric material may be compressed or expanded, and the transition pressure chamber can be variously arranged. The elastomeric material may then be transferred between a die and a roller in which the die is shaped and sized to cause the elastomeric material to assume a likewise desired shape and size. The elastomeric material is located against and drawn by the roller across the die, and the roller functions to pull the elastomeric material some distance downstream to a subsequent processing stage if desired.

Although capable of forming a product of a desired shape and size, extrusion through the use of a roller nose extruder is limited in that only a single type of material can be formed by the die and roller combination after extrusion. In order to form products of different types of material, a process known as coextrusion can be employed. Coextrusion involves the use of two or more different extruders, each having their own helical screw, to push two or more different types of elastomeric materials through their own extrusion barrel. These two or more different streams of material are moved into engagement with one another exiting from a die head as a single product made of the multiple extruded components.

The formation of tread for tires may be executed by a coextrusion process in which multiple extruders, each having its own extrusion barrel, are arranged in a vertical plane with one another to channel their own extruded component into a head to result in the formation of tire tread having different rubber types at different locations. A known extrusion system 10 is shown in FIG. 1 and includes three extruders 12, 14, 16. The three extrusion barrels 50, 52, 54 are arranged in a plane into which the vertical direction 40 lies. The extrusion barrels 50, 52, 54 are set up so that extruded components 24, 26, 28 are directed through a die 22 to form a coextruded tread 20 that has three layers 34, 36, 38 each made up of a different material.

Due to the vertical orientation of the extruders 12, 14, 16, the tread 20 exits the die 22 and is pulled off by the roller 30 so that the tread 20 is oriented with its road engagement surface on the top and its underlayer on the bottom as shown with reference to FIG. 2. The tread 20 has a bottom first layer 34 made up of the first extruded component 24, a middle second layer 36 made of the second extruded component 26, and a top third layer 38 made of the third extruded component 28. The tread 20 has this orientation relative to the ground 18 in the vertical direction 40 as it exits the die 22 as per the vertical orientation of the extruders 12, 14, 16. The tread 20 may be transported downstream away from the die 22 by the roller 30 and then be directed over a downstream second roller 32 to change its direction of travel while keeping the tread 20 still oriented to the ground 18 and vertical direction 40 so that the width of the tread 20 does not point or extend towards the ground 18. The tread 20 may be moved downstream to a subsequent processing station for attachment to a carcass or for processing as a retread band.

Arrangement of the three extrusion barrels 50, 52, 54 in a common vertical plane requires the presence of a foundation pit 42 disposed from the ground 18 at a pit depth 44 from 2 to 3 meters in the vertical direction 40. In the FIG. 1 embodiment, at least a portion of the first extrusion barrel 50, and the first driving mechanism 56 are located within the foundation pit 42 some distance down from the ground 18 in the vertical direction 40. The extrusion system 10 can be supplied with 2, 3, 4, 5 or more extruders and any number of them, such as one or two, could have to be located within the foundation pit 42. The entire extrusion barrel 50, or just parts of the first extrusion barrel 50 may be located within the foundation pit 42. The placement of all or parts of one, two, or more extruders within the foundation pit 42 allows the coextrusion process to be executed to produce the multi-component tread 20 in the discussed orientation. Placement in a common vertical axis requires the construction of a large support structure 46 in the foundation pit 42 to hold all of the extruders 12, 14, 16. The construction of the foundation pit 42 and support structure 46 may be at a cost of $750,000 with reduced operator ergonomics and maintenance accessibility. As such, there remains room for variation and improvement within the art of an extrusion system 10 for the production of multi-component tread 20.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended Figs. in which.

Figure 1:
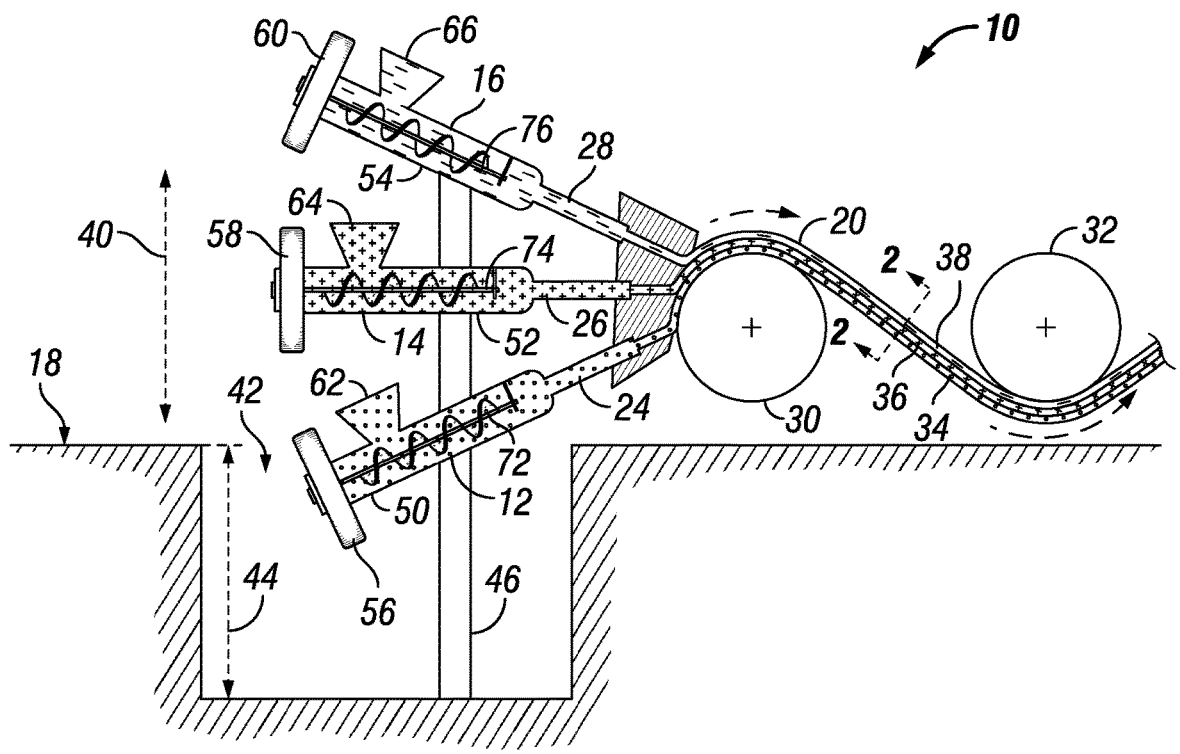
FIG. 1 is a side view of a prior art extrusion system for the production of tread made of multiple components.
Figure 2:
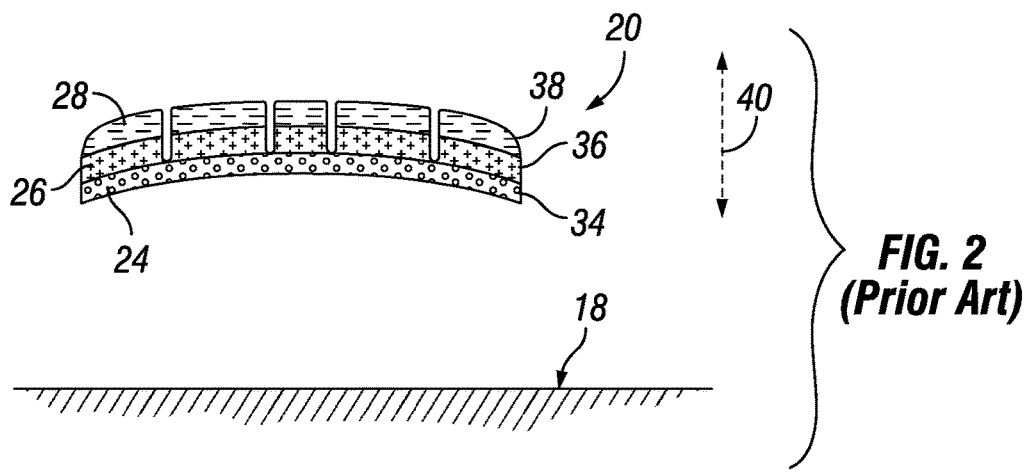
FIG. 2 is a cross-sectional view taken along line 2-2 of FIG. 1 showing the tread and its orientation relative to the ground with other elements of FIG. 1 eliminated.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

The present invention provides for an extrusion system 10 that utilizes a plurality of extruders for the production of tire tread 20 that is made of multiple components. The extruders have extrusions barrels that are oriented in a horizontal plane 70 instead of in a vertical plane with respect to the vertical direction 40. The extruders can all be located in the vertical direction 40 relative to the ground 18 so that a foundation pit 42 is not needed. The extruded tread 20 may exit the die 22 in a rotated orientation relative to the ground 18, and if desired can be subsequently twisted by an adjustment mechanism 48 so that the tread 20 is oriented into a desired angle relative to the ground 18.

Figure 3:
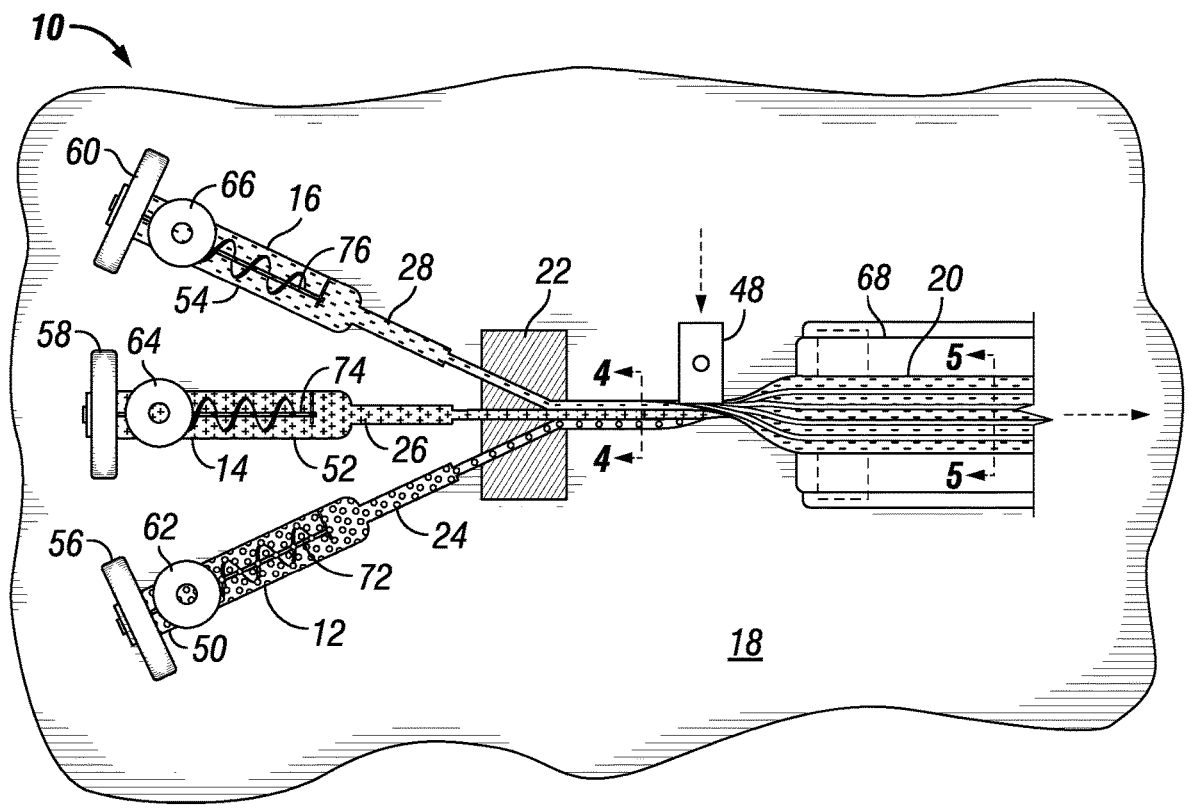
FIG. 3 is a top view of an extrusion system for the production of tread made from multiple components.

FIG. 3 show a top view of an extrusion system 10 that has three extruders 12, 14, 16 organized into a horizontal plane for the extrusion of tread 20 made of multiple extruded components 24, 26, 28. The coextrusion process shown can employ various types of extruders 12, 14, 16 and it is to be understood that the types shown and described are only exemplary. Further, although three extruders 12, 14, 16 are shown, any number may be utilized in other embodiments such as 2, 4, 5, or up to 20 extruders. The first extruder 12 extrudes the first extruded component 24 and includes the first extrusion barrel 50 which can be an elongated cylinder with a helical screw contained therein. Second and third extruded components 26, 28 are also present in the disclosed extrusion system 10 but they are different from one another and are also different from the first extruded component 24. The differences between the extruded components 24, 26, 28 may be in that they are not the same type of material as one another. In some instances, the first extruded component 24 is rubber of a particular composition, while the second extruded component 26 is rubber of a different composition, and the third extruded component 28 is rubber of a yet further different composition. The extruded components 24, 26, 28 are different materials from one another in that they include a unique material or materials, or in that that they include the same materials as another one albeit in a different proportion/combination from the other extruded components 24, 26 or 28.

A first extrusion screw, which can be the helical screw previously mentioned, can be located within the first extrusion barrel 50. The first extruded component 24 is introduced into the first extrusion barrel 50 via a first hopper 62 located on top of the first extrusion barrel 50 in the vertical direction 40. The first hopper 62 and the rear portion of the first extrusion barrel 50 can be referred to as a feed section of the first extruder 12. A first driving mechanism 56 is carried by the first extrusion barrel 50 and can be a motor, a gear set, or any other motion generation or translation device that imparts a rotational motion to the first extrusion screw within the first extrusion barrel 50. Rotation of this helical screw causes the first extruded component 24 to be broken up, compressed and formed into a more pliable form. The middle portion of the first extrusion barrel 50 can be referred to as a compression section, and it is in this section where the majority of the forming and compression occurs. Heat may be generated through the rotation of the first extrusion screw to further shape or break down the first extruded component 24, and in addition heaters may be positioned at the compression section to impart additional heat into the first extruded component 24 to aid in its molding. Continued rotation of the first extrusion screw will push the first extruded component 24 down the entire length of the first extrusion barrel 50 to a metering section at the end of the first extrusion barrel 50. From here, pressure in the first extrusion barrel 50 will push the first extruded component 24 past elements such as a breaker plate, vault, die head or die. These elements will further shape the first extruded component 24 or increase or decrease its size. A die 22 is shown in FIG. 3 is in communication with the first extrusion barrel 50 and will channel the first extruded component 24 into position with the other extruded components 24, 26 and may change its size or shape. It is to be understood that the use of the term "die" is broad enough to include variously described components such as a vault, die head, or breaker plate or any other element, such as a preformer, that functions to channel and/or shape the component 24. The die 22 may also function to split the flow of the first extruded component 24 up into two or more different streams for placement within the tread 20. The various components 24, 26, 28 are brought into engagement in the die 22 or are placed into close proximity in the die 22 and subsequently engaged with one another downstream from the die 22.

The extrusion system 10 may also include a second extruder 14 that include a second extrusion barrel 52 that houses a second extruded component 26 introduced therein via a second hopper 64. As stated, the second extruded component 26 is not the same type of material as the first extruded component 24. A second extrusion screw in the second extrusion barrel 52 rotates in order to force the second extruded component 26 out of the second extrusion barrel 52. A second driving mechanism 58 functions to rotate the helical screw contained within the second extension barrel 52. The second extrusion barrel 52 is isolated from the first extrusion barrel 50 so that their contents are not transferred into one another. The first and second extrusion screws may be helical in some embodiments so that their rotation causes the described movement of the first and second extruded components 24, 26 out of and towards the die 22. In other arrangements, the first and second extrusion screws need not be used and any mechanism capable of breaking up and forming and then pushing or removing the first and second extruded components 24, 26 from the first and second extrusion barrels 50, 52 can be employed. For example, a plunger arrangement, a gravity feed arrangement, a paddle wheel arrangement, or meshing gears in the form of a gear pump can be used to push the first and second extruded components 24, 26 through the extrusion system 10.

A third extruder 16 is also included and features a third extrusion barrel 54 with a helical screw driven by a third driving mechanism 60. A third hopper 66 is present to allow the third extruded component 28 to be inserted into the third extrusion barrel 54. The third extruded component 28 is broken up and formed in the third extrusion barrel 54 and subsequently pushed downstream to the die 22. The second extruder 14 and the third extruder 16 may be configured the same way as the elements described with respect to the first extruder 12 and a repeat of this information is not necessary. However, it may be the case that the various extruders 12, 14, 16 are not constructed in the same manner and have different components and are arranged differently from one another in other embodiments so that they are not alike.

The three extruded components 24, 26 and 28 are pushed from their respective barrels 50, 52, 54 and into the die 22. The paths to the die 22 may all be alike, or one or more of the components 24, 26, 28 could travel through an element, such as a vault, while the other one or ones of the components 24, 26, 28 do not travel through such element. A roller could be present on the downstream side of the die 22 in some instances onto which the components 24, 26, 28 exiting the die 22 are deposited. The die 22 may or may not engage such roller if it is present. The die 22 functions to size and shape the extruded components 24, 26, 28 and engage them with one another, or put them in close proximity so that they are engaged upon exiting the die 22. In some embodiments, one or more of the streams of the first extruded component 24, the second extruded component 26, or the third extruded component 28 do not go through the die 22 but instead have one or more of the other components 24, 26, 28 disposed thereon as they will go through the die 22 for shaping and/or sizing.

The combined stream of first, second, and third extruded components 24, 26, 28 make up the tread 20 that exits the die 22 and is transported to a conveyor 68 and moved downstream for subsequent processing. A roller, not shown in FIG. 3, may be used to pull the tread 20 downstream to the conveyor 68. Alternatively, movement of the conveyor 68 may function to pull the tread 20 downstream and away from the die 22. The tread 20 can be moved downstream from the conveyor 68 for subsequent processing. Subsequently, the tread 20 may be applied to a carcass to form a tire, or may be processed into a band for a retreading process. The tread 20 exiting the die 22 could be considered a finished product at this point upon engaging the conveyor 68 or otherwise being moved out of the die 22.

The three extruders 12, 14, 16 are arranged so that they are oriented into a horizontal plane 70 instead of a vertical plane relative to the vertical direction 40. As shown in the top view of FIG. 3, the three extrusion barrels 50, 52, 54 are all visible and a tread 20 re spaced from one another and are not positioned over top of one another. The extrusion barrels 50, 52, 54 could touch one another in certain embodiments but should be arranged so that they are located above the ground 18 and not placed into a foundation pit 42 so that some of the extrusion barrels 50, 52, 54 are outside of the foundation pit 42 while others are completely or at least partially within the foundation pit 42. Horizontal placement of the extrusion barrels 50, 52, 54 causes the extruded components 24, 26, 28 to enter the die 22 at a ninety degree angle to which they otherwise would have been had the extrusion barrels 50, 52, 54 been vertically placed relative to one another. The extruded components 24, 26, 28 maintain their position relative to one another as they flow through the die 22 and exit keeping this relative position such that the second extruded component 26 is between the first and third extruded components 24, 28 both before entering the die 22 and through the die 22 and exiting the die 22. However, in some embodiments, the channels in the die 22 can be shaped so that some of the extruded components 24, 26, 28 change relative positions with respect to one another such that, for example, some or all of the first extruded component 24 is between all or some of the second and third extruded components 26, 28 when exiting the die 22.

Figure 4:
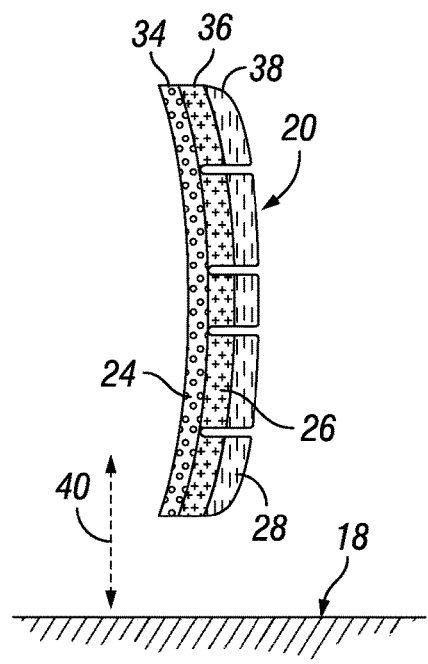
FIG. 4 is a cross-sectional view taken along line 4-4 of FIG. 3 showing the tread and its orientation relative to the ground with other elements of FIG. 3 eliminated.

The tread 20 exiting the die 22 is transported therefrom so that it is angled relative to the ground 18 in that the side edge of the tread 20 directly faces the ground 18 and the top and bottom of the tread 20 does not directly face the ground 18. FIG. 4 shows the orientation of the tread 20 relative to the ground 18 at a point in the process in which the tread 20 has exited the die 22. The first extruded component 24 forms a first layer 34 of the tread 20 which is a layer that engages the carcass of the tire, or is a layer that is at the bottom/radially inward position on the tire when the tread 20 is incorporated into the tire. The third extruded component 28 forms the third layer 38 of the tread 20 which is the initial ground engaging surface of the tread 20 when the tire is in normal use. The second layer 36 is made by the second extruded component 26 and is between the first and third layers 34, 38. Longitudinal grooves are present in the tread 20 and extend through both the second and third layers 36, 38 and terminate at the first layer 34 but do not extend through any of the first layer 34. As can be envisioned, the tread 20 can be variously configured in accordance with other embodiments so that any number of layers can be present, the longitudinal grooves can extend into/through any or all of the layers, and so that the layers need not all be flatly placed onto one another but could be thicker or thinner in certain points or may be between other locations of adjacent layers.

In FIG. 4, all three layers 34, 36, 48 directly face the ground 18, and it may be the case in other embodiments that all of the layers 24, 26, 28 of the tread 20 directly face the ground 18 upon exiting the die 22. If an object is between the ground 18 and the tread 20, then the three layers 34, 36, 38 could all be said to the same distance to the ground 18 in the vertical direction 40. In FIG. 4, various components of the extrusion system 10 are not shown for sake of clarity and the elements that are shown are the tread 20 and ground 18 to illustrate the relationship between these two objects at this point in the manufacturing process. The ground 18 is to be defined as the floor of a building shop or other horizontal surface as distinguished from a foundation pit 42 which is an opening into the ground 18 some pit depth 44 in the vertical direction 40. With reference back to FIG. 3, an adjustment mechanism 48 engages the tread 20 in the space between the die 22 and the conveyer 68 in the machine direction. The adjustment mechanism 48 illustrated is a roller that pushes the top portion of the third layer 38 and rotates the tread 20 ninety degrees about its horizontal axis, which is the axis of the machine direction being the direction of travel of the tread 20 out of the die 22. The adjustment mechanism 48 need not be a roller in other embodiments, but could be any sort of device capable of rotating the tread 20 ninety degrees upon exiting the die 22. In some instances, the adjustment mechanism 48 need not be a separate component, but could in addition or alternatively be a notch or orientation of the conveyor 68 or other transport mechanism that functions to both transport the tread 20 and change its orientation relative to the ground 18. In other embodiments, an adjustment mechanism 48 is not necessary. Here, if one desires to rotate the tread 20, the distance from the die 22 to the conveyor 68 can be adjusted to find an optimal configuration to allow the tread 20 to rotate and lay onto the conveyor 68 in a desired orientation.

Figure 5:
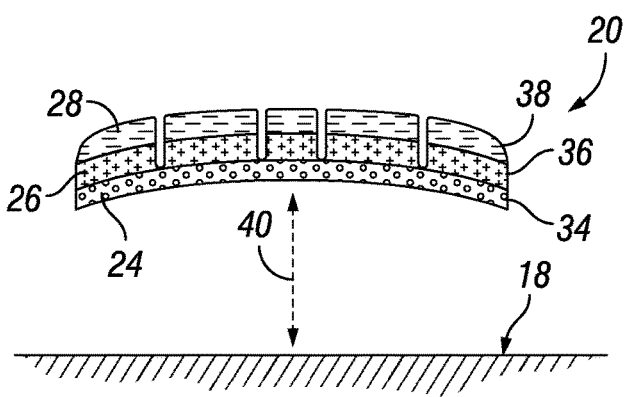
FIG. 5 is a cross-sectional view taken along line 5-5 of FIG. 3 showing the tread and its orientation relative to the ground with other elements of FIG. 3 eliminated.

When the adjustment mechanism 48 is a roller it may be spring loaded or can otherwise supply sufficient force to the tread 20 to rotate it relative to the ground 18 into the position shown in FIG. 5 which is at a point after the adjustment mechanism 48 in the machine direction and on the conveyor 68. In FIG. 5, the conveyor 68 and other components of the extrusion system 10 are not shown for sake of clarity but instead the tread 20 and the ground 18 are illustrated to shown their relative orientation. The tread 20 is turned so that its bottom layer, which is the first layer 34, is oriented closest to the ground 18 in the vertical direction 18. The first layer 34 may directly face the ground 18 or if a component is between it and the ground, such as the conveyor 68, the first layer 34 is closer to the ground 18 in the vertical direction 40 than any other ones of the layers 34, 36 of the tread 20. The third layer 38 which is the ground engaging surface of the tire when the tread 20 is incorporated into the tire is the layer of the tread 20 farthest from the ground 18 in the vertical direction 40 in FIG. 5. The rotation of the tread 20 corrects for the post die 22 orientation caused by the horizontal orientation of the extruders 12, 14, 16 so that the tread 20 is in a desired orientation following the coextrusion process. However, it may be the case that one desires the tread 20 to maintain the orientation shown in FIG. 3 at the point it exits the die 22 and thus an adjustment mechanism 48 is not included or used and the tread 20 is utilized in the FIG. 4 orientation at locations downstream from the extrusion system 10.

Figure 6:
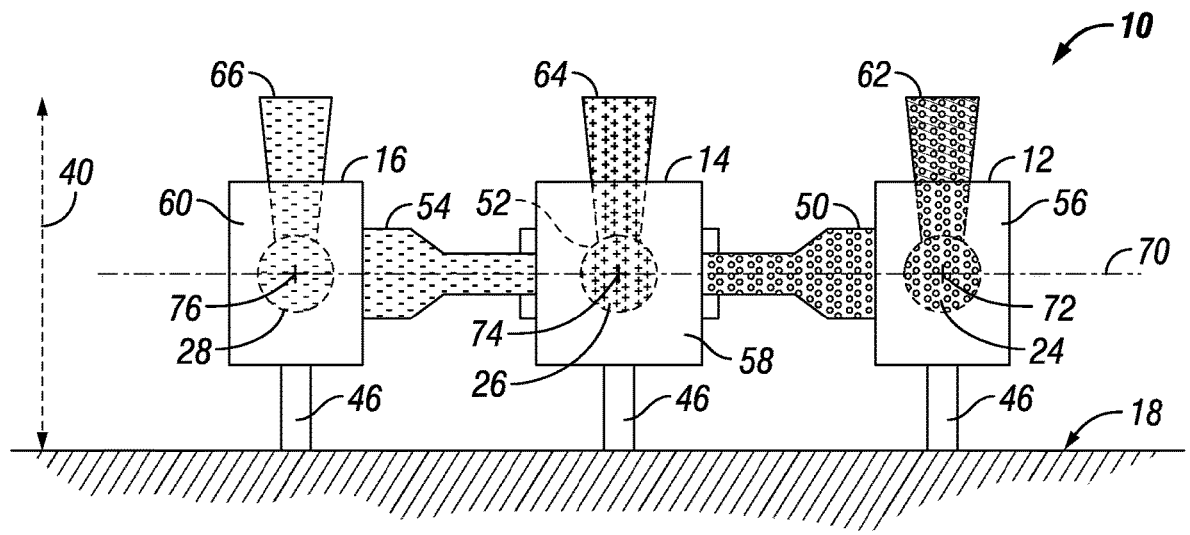
FIG. 6 is left hand side view of the extrusion system of FIG. 3.

FIG. 6 shows a left side view of the extrusion system 10 of FIG. 3 in which a support structure 46 is shown as holding the extruders 12, 14, 16 up off of the ground 18 in the vertical direction 40. As can be seen, a foundation pit 42 is not present in FIG. 6 and all portions of the first, second, and third extrusion barrels 50, 52, 54 are located above the ground 18 in the vertical direction 40. Further, no portions of the driving mechanisms 56, 58, 60 are located below the ground 18 and are all spaced some distance from the ground 18 in the vertical direction 40. Still further, no portions of the hoppers 62, 64, 66 or the extruded components 24, 26, 28 at any point are below the ground 18 and are all spaced some distance from the ground 18 in the vertical direction 40. The extrusion system 10 is arranged so that all of the components of the extruders present, such as the driving mechanisms, extrusion barrels, hoppers, and extruded components processed are all some distance in the vertical direction 40 above the ground 18.

The horizontal plane 70 extends through the center of the three extrusion barrels 50, 52, 54 such that the horizontal plane 70 can extend through the axes 72, 74, 76 of the extrusion screws in the three extrusion barrels 50, 52, 54. In this regard, the three extrusion barrels 50, 52, and 54 can be described as being oriented in a horizontal plane 70, and in effect the three extruders 12, 14, 16 can be described as being oriented in a horizontal plane 70 since they each have a component that is within the common horizontal plane 70. The horizontal plane 70 also extends through the three driving mechanisms 55, 58, 60 so that they are likewise all located within a common horizontal plane 70. The horizontal plane 70 is spaced some distance in the vertical direction 40 from the ground 18 and is not located within a foundation pit 42. A support structure 46 supports the extrusion barrels 50, 52, 54 and the support structure 46 likewise is not located in a foundation pit 42. The support structure 46 need not be a single structure but could be multiple structures that are located on the ground 18 and support the various extrusion barrels 50, 52, 54 and may or may not engage one another. None of the support structures 46 or any portion thereof may be placed within a foundation pit 42.

To be located in the same horizontal plane 70, it need not be the case that all of the axes 72, 74, 76 of the extrusion screws of all of the extrusion barrels 50, 52, 54 be located within the common horizontal plane 70. Instead, it may simply be the case that the common horizontal plane 70 extends through at least a portion of each one of the extrusion barrels 50, 52, 54. The horizontal plane 70 could extend through the upper portion of the first extrusion barrel 50 but miss the extrusion screw axis 72 of the first extrusion barrel 50, and then extend through the extrusion screw axis 74 of the second extrusion barrel 52, and then through the lower part of the third extrusion barrel 54 missing its extrusion screw axis 76. In some embodiments, at least two of the extrusion barrels 50, 52, or 54 share a common horizontal plane 70 that it runs through parts of at least two of them, while the other extrusion barrel(s) 50, 52, or 54 in the extrusion system 10 are above or below this common horizontal plane 70 so that it does not extend through any portion of them, but none of the extrusion barrels 50, 52, 54 are located completely or even partially within a foundation pit 42. The horizontal plane 70 may be parallel with the ground 18 and is spaced some distance from the ground 18 in the vertical direction 40. Other portions of the extrusion system 10 may or may not be within the horizontal plane 70 such as the tread 20, the die 22, the conveyor 68, the adjustment mechanism 48, or the hoppers 62, 64, 66.

Figure 7:
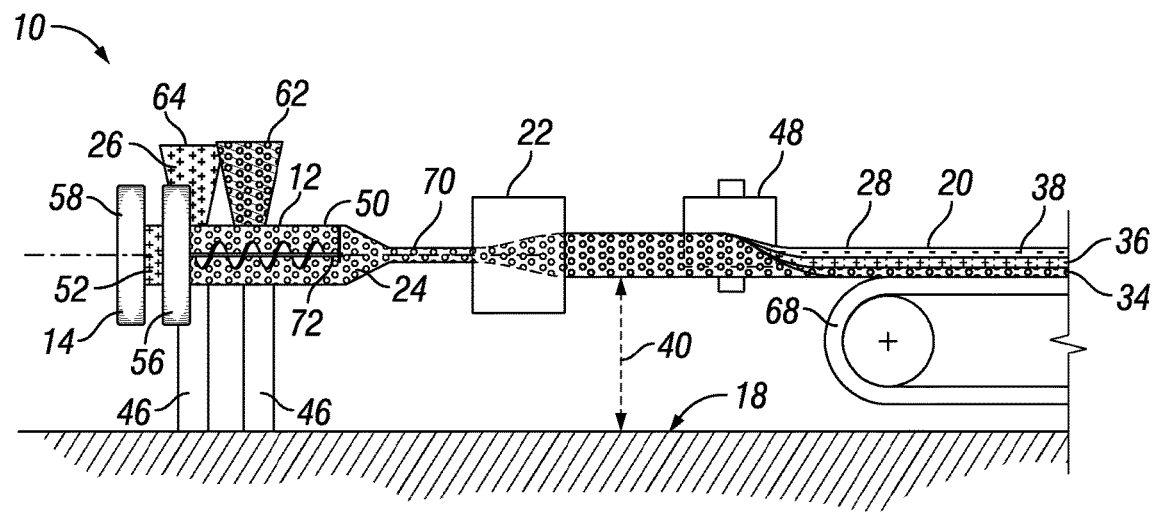
FIG. 7 is a front view of the extrusion system of FIG. 3.

FIG. 7 shows a front view of the extrusion system 10 with the horizontal plane 70 extending through the axes 72, 74, 76 of the helical screws of the extrusion barrels 50, 52, 54, the driving mechanisms 56, 58, 60, the die 22, the tread 20, and extruded components 24, 26, 28. Exiting the die 22, only the first layer 34 is visible but once the tread 20 is rotated by the adjustment mechanism 48 all three layers 34, 36, 38 are visible with the first layer 34 now at the bottom and the third layer 38 at the top in the vertical direction 40. As can be seen, the rotation of the tread 20 is accomplished by the adjustment mechanism 48 so that it is rotated 90 degrees from its orientation exiting the die 22 before it is placed onto the conveyor 68.

Although shown and described as employing three extruders 12, 14, 16 with three extrusion barrels 50, 52, 54, it is to be understood that the extrusion system 10 may be include any number of extruders with extrusion barrels so long as they are two or more in number to result in a coextrusion process. Orientation of the extrusion barrels 50, 52, 54 into a common horizontal plane 70 eliminates the need for a foundation pit 42 as well as the large support structure 46 to support the extruders 12, 14, 16. With the extruders 12, 14, 16 at floor level, the supply of extruded components 24, 26, 28 to the hoppers 62, 64, 66 is much easier and common to each extruder 12, 14, 16. The loading of tooling is more ergonomic and safety may be improved as there are reduced or eliminated product paths above the operators work zones.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An extrusion system for the production of tire tread, comprising:
    a first extruder having a first extrusion barrel;
    a first extruded component that is transferred through the first extrusion barrel;
    a second extruder having a second extrusion barrel;
    a second extruded component that is transferred through the second extrusion barrel; and
    a die that receives the first extruded component and the second extruded component to coextrude tire tread from the first extruded component and the second extruded component;
    wherein a horizontal plane located above ground in a vertical direction extends through both the first extrusion barrel and the second extrusion barrel;
    wherein the first extruded component forms a first layer of the tire tread and wherein the second extruded component forms a second layer of the tire tread, wherein the first layer and the second layer have widths that extend in the vertical direction;
    and further comprising an adjustment mechanism that engages the tire tread and rotates the tire tread such that the tire tread has a twist such that the first layer is located closer to the ground than the second layer;
    a conveyor that receives the tire tread, wherein the adjustment mechanism rotates the tire tread after the coextrusion from the die and before the conveyor engages the tire tread, and wherein the twist the adjustment mechanism causes to the tire tread is a 90 degree rotation of the tire tread from its orientation exiting the die before it is received by the conveyor.

2. The extrusion system as set forth in claim 1, further comprising:
    a third extruder having a third extrusion barrel;
    a third extruded component that is transferred through the third extrusion barrel;
    wherein the die receives the third extruded component to coextrude the tire tread from the first extruded component, the second extruded component, and the third extruded component;
    wherein the horizontal plane extends through the first extrusion barrel, the second extrusion barrel, and the third extrusion barrel.

3. The extrusion system as set forth in claim 1, wherein the first extrusion barrel has a first extrusion screw that rotates about a first extrusion screw axis, and wherein the second extrusion barrel has a second extrusion screw that rotates about a second extrusion screw axis, and wherein the horizontal plane extends through the first extrusion screw axis and the second extrusion screw axis.

4. The extrusion system as set forth in claim 1, wherein no portion of the first extruder is located within a foundation pit, and wherein no portion of the second extruder is located within the foundation pit.

5. The extrusion system as set forth in claim 1, wherein the first extrusion barrel has a first extrusion screw that rotates about a first extrusion screw axis, and wherein the second extrusion barrel has a second extrusion screw that rotates about a second extrusion screw axis, and wherein the horizontal plane extends through the first extrusion screw axis but does not extend through the second extrusion screw axis.

6. The extrusion system as set forth in claim 1, wherein the first extruded component and the second extruded component are different materials from one another.

7. The extrusion system as set forth in claim 6, wherein the first extruded component is synthetic rubber, natural rubber, a combination of both synthetic and natural rubber, synthetic resin, or a combination of rubber and synthetic resin; and
    wherein the second extruded component is synthetic rubber, natural rubber, a combination of both synthetic and natural rubber, synthetic resin, or a combination of rubber and synthetic resin.

8. The extrusion system as set forth in claim 1, wherein the first extruder has a first driving mechanism, and wherein the second extruder has a second driving mechanism, wherein the horizontal plane extends through the first driving mechanism, and wherein the horizontal plane extends through the second driving mechanism.

9. The extrusion system as set forth in claim 1, wherein the die includes a preformer.

* * * * *